(12) United States Patent
Piasecki et al.

(10) Patent No.: US 10,641,290 B1
(45) Date of Patent: May 5, 2020

(54) DUCTED FAN HAVING AERODYNAMIC FEATURES

(71) Applicant: Piasecki Aircraft Corporation, Essington, PA (US)

(72) Inventors: John W. Piasecki, Bryn Mawr, PA (US); Frederick W. Piasecki, Haverford, PA (US)

(73) Assignee: Piasecki Aircraft Corporation, Essington, PA (US)

( * ) Notice: Subject to any disclaimer, the term of this patent is extended or adjusted under 35 U.S.C. 154(b) by 127 days.

(21) Appl. No.: 15/709,075

(22) Filed: Sep. 19, 2017

Related U.S. Application Data

(60) Provisional application No. 62/397,287, filed on Sep. 20, 2016.

(51) Int. Cl.
*B64C 7/02* (2006.01)
*F04D 29/54* (2006.01)
*F04D 29/56* (2006.01)
*B64D 29/06* (2006.01)
*F04D 29/52* (2006.01)

(52) U.S. Cl.
CPC .............. *F04D 29/563* (2013.01); *B64C 7/02* (2013.01); *B64D 29/06* (2013.01); *F04D 29/526* (2013.01); *F04D 29/547* (2013.01)

(58) Field of Classification Search
CPC ..... F04D 29/526; F04D 29/547; F04D 29/563; B64C 7/02
USPC .................................................. 415/126, 127
See application file for complete search history.

(56) References Cited

U.S. PATENT DOCUMENTS

| | | | |
|---|---|---|---|
| 3,524,611 A | 8/1970 | Frank | |
| 5,035,377 A | 7/1991 | Buchelt | |
| 8,821,123 B2 * | 9/2014 | Camci | F01D 25/26 416/189 |
| 9,297,333 B2 * | 3/2016 | Filter | F02K 1/06 |
| 2011/0147533 A1 | 6/2011 | Goossen | |
| 2011/0250066 A1 * | 10/2011 | De Roche | B64C 11/001 415/214.1 |
| 2017/0159674 A1 * | 6/2017 | Maciolek | B64C 7/02 |
| 2019/0270517 A1 * | 9/2019 | Morgan | B64C 29/0025 |

* cited by examiner

*Primary Examiner* — Erick R Solis
(74) *Attorney, Agent, or Firm* — Robert J. Yarbrough of Lipton, Weinberger & Husick

(57) ABSTRACT

A ducted fan for an aircraft or other vehicle includes aerodynamic features to selectably move the thrust vector of the ducted fan from the axis of rotation of the ducted fan, providing additional and redundant control authority to a control system. The control system may apply the aerodynamic features asymmetrically about the circumference of the duct and may apply the aerodynamic features differentially among a plurality of ducted fans. The aerodynamic features may include a morphing leading edge portion, an air dam, vanes and trailing edge control surfaces.

11 Claims, 11 Drawing Sheets

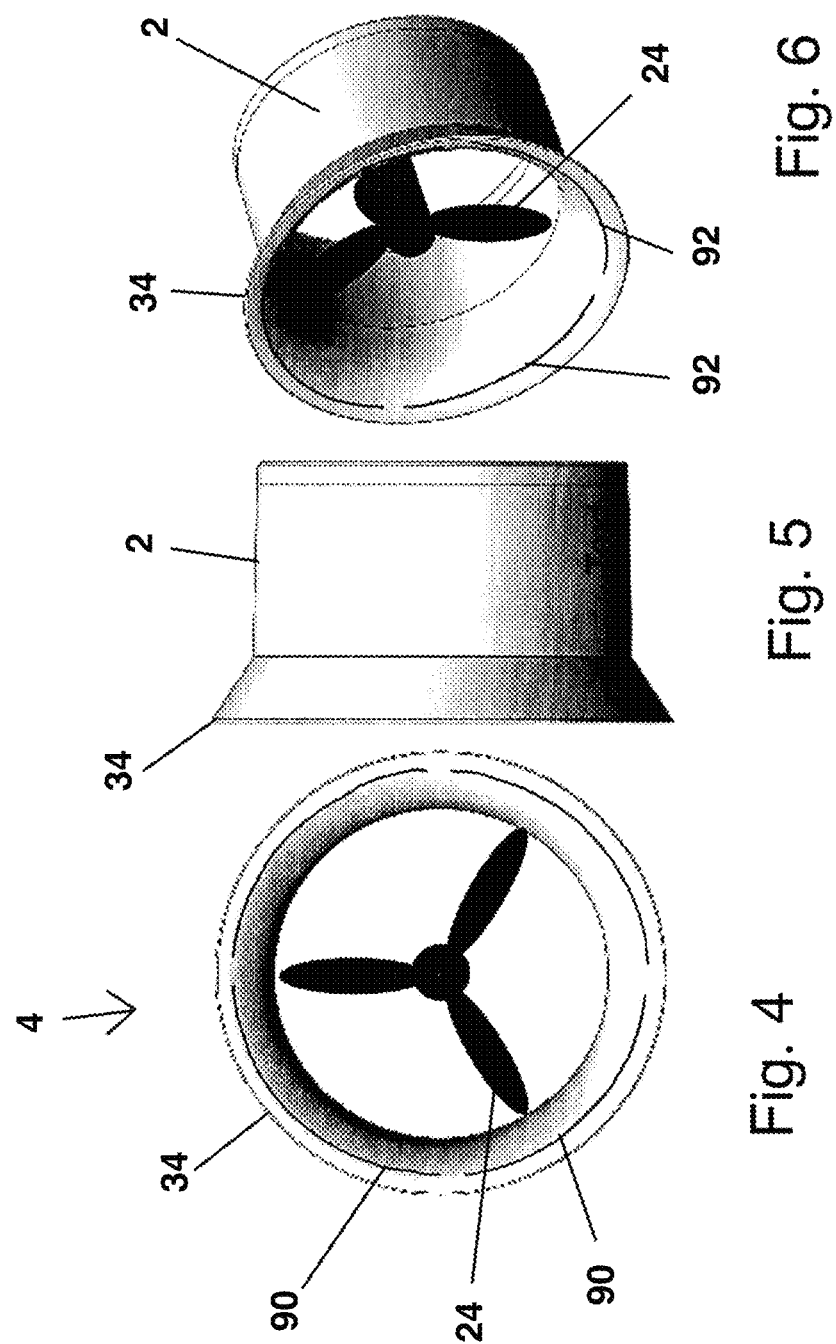

DUCTED FAN HAVING AERODYNAMIC FEATURES

I. RELATED APPLICATIONS

This application is entitled to priority from U.S. Provisional Patent Application 62/397,287 entitled 'Ducted fan having aerodynamic features' by the inventors herein filed Sep. 20, 2016. Provisional application 62/397,287 is hereby incorporated by reference as if set forth in full herein.

II. BACKGROUND OF THE INVENTION

A. Field of the Invention

The Invention is a ducted fan having aerodynamic features to provide redundant control effectors and additional control authority for an aircraft. The ducted fan of the invention may be used to provide additional control authority and redundant control effectors for any aircraft having a ducted fan. The ducted fan of the invention is particularly useful to provide redundant control effectors and additional control authority for a modular and morphable air vehicle comprising an flight module featuring a pair of ducted fans.

B. Description of the Related Art

U.S. Provisional Patent Application 61/345,535, filed May 17, 2010 by John W. Piasecki and others and U.S. Provisional Patent Application No. 61/416,965 filed Nov. 24, 2010 by John W. Piasecki and others are hereby incorporated by reference in this document as if set forth in full herein. U.S. utility patent application Ser. No. 13/068,601 filed May 16, 2011 by John W. Piasecki and others and U.S. Pat. No. 9,045,226 to the same inventors issued Jun. 2, 2015 are incorporated by reference in this document as if set forth in full herein. U.S. Pat. No. 9,393,847 issued Jul. 19, 2016 and U.S. Pat. No. 9,610,817 issued Apr. 4, 2017 also are hereby incorporated by reference as if set forth in full herein.

The documents incorporated by reference disclose a modular and morphable air vehicle. One of the embodiments of the modular and morphable air vehicle has two ducted fans configured to support a flight module in flight. The flight module is referred to as an 'air module' in the documents incorporated by reference. The flight module is configured to selectably support a mission module in flight. The documents incorporated by reference refer to the mission module as the 'ground module.' The flight module and mission module combination or the flight module alone may fly as a rotary wing aircraft in a side-by-side configuration and also may fly as a fixed wing aircraft in a tilted-rotor configuration. The flight module may move between the side-by-side and tilted-rotor configurations 'in stride;' that is, during flight. The flight module may have other configurations as disclosed in the in documents incorporated by reference.

The mission module may be a wheeled passenger vehicle and may be driven on the ground under its own power either with or without the flight module attached. Alternatively, the flight module may be a medical module, a cargo module, a weapons module, a passenger module, a communications module, or any other module disclosed by the documents incorporated by reference. The flight module can fly either with or without the mission module engaged and can support the mission module in flight.

III. BRIEF DESCRIPTION OF THE INVENTION

A. Morphing Ducts

The invention is a ducted fan having a duct that includes aerodynamic features that improve the efficiency of the ducted fan or that provide additional and redundant control authority to an aircraft to which the ducted fan is attached. Each feature that provides control redundancy provides the aircraft control system with more control options.

The ducted fan of the Invention may be used for any aircraft having a ducted fan, including a flight module as described in the documents incorporated by reference. Where this document discusses the ducted fan of the Invention with respect to a flight module, the discussion applies equally to any aircraft having one or more ducted fans. The ducted fan of the Invention may improve the efficiency, provide redundant control effectors and provide additional control authority for any vehicle having a ducted fan.

The aerodynamic features may include a duct having a morphable leading edge portion, a duct having an air dam on the leading edge portion and a duct having movable vanes. The aerodynamic features may be selectably actuated asymmetrically about the circumference of a duct. As used in this document and in the claims, the terms 'asymmetric' and 'asymmetrically' means that that an aerodynamic feature may be deployed about a radial portion of a duct differently than about another radial portion of the same duct.

For a flight module having two ducted fans, or for any vehicle having more than one ducted fan, the aerodynamic control features may be selectably actuated differentially among the ducted fans. As used in this document and in the claims, the terms 'differential' and 'differentially' means that an aerodynamic feature may be deployed differently for one ducted fan than for another ducted fan on the same vehicle.

As used in this document and in the claims, the term 'thrust vector' means the force applied to the aircraft by a ducted fan. When aerodynamic features are symmetrically deployed about the circumference of the duct, the thrust vector of the ducted fan coincides with the axis of rotation of the rotor of the ducted fan. When aerodynamic features are asymmetrically deployed, the thrust vector is displaced from the rotor axis of rotation. As used in this document and in the claims, the term 'asymmetric thrust' means that the thrust vector generated by a ducted fan in the direction of the axis of rotation of the ducted fan does not coincide with the axis of rotation of the ducted fan rotor due to the action of an aerodynamic feature of the duct. Selectable asymmetric thrust due to the action of the aerodynamic features provides additional and redundant control authority to the control system.

A morphing duct is a duct that changes shape. The leading edge portion of each morphing duct has a low-speed position and a high-speed position. The outside diameter, surface area and frontal area of the leading edge portion of the duct is greater in the low-speed position than in the high-speed position. In the low-speed position, the movement of inrush air into the duct across the large leading edge portion generates excess lift in the direction of thrust of the ducted fan as a result of the Bernoulli relation. In the high-speed position, the outside diameter and surface area of the leading edge portion and the frontal area of the duct are smaller than when the duct is in the low-speed position. The duct therefore causes less drag as the duct moves through the air in the direction of the rotor axis of rotation, but the leading edge portion does not provide as much aerodynamic lift as when the duct is configured in the low-speed position.

For a flight module having side-by-side and tilted rotor configurations, the flight module is configured to utilize the duct leading edge in the low-speed position generally when the ducts are in the side-by-side configuration. The flight module is configured to utilize the duct leading edge in the high-speed position generally when the ducts are in the tilted-rotor configuration. At low flight module airspeeds in the side-by-side configuration, the lift generated at the leading edge portion of the duct contributes to the thrust generated by the ducted fan. At higher air speeds in the tilt-rotor configuration, the lift benefit of the relatively large leading edge portion is overcome by the increased drag caused by the movement of the large leading edge portion through the air.

The duct may be configured to move automatically to the low-speed position when the flight module is in the tandem or side-by-side configurations and to move automatically to the high-speed position when the flight module is in the tilted-rotor configuration. The position of the leading edge portion of the duct may be mechanically linked to the configuration of the flight module. Alternatively, the leading edge portion may move between the low- and high-speed positions under the control of the control system independent of whether the flight module is in the side-by-side or tilted rotor configurations. The leading edge portions also may be in a configuration intermediate to the low-speed position and high-speed position, as selected by the control system or by a mechanical linkage linking the configuration of the flight module to the low- and high-speed positions of the leading edge portion.

For the flight module having a pair of ducted fans, the leading edge of each ducted fan may move between the low- and high-speed positions differentially; that is, one duct may be in a low-speed position while the other is in the high-speed position. As an example, when the flight module is hovering in the side-by-side configuration with the starboard ducted fan in the low-speed position and the port ducted fan in the high-speed position, the extra lift generated by the starboard ducted fan will apply a rolling moment tending to roll the flight module to the left. As a second example, when the flight module is flying at high speed in the tilted-rotor configuration, moving the starboard side ducted fan to the low-speed position from the high-speed position while the port side ducted fan is in the high-speed position will cause additional drag on the starboard side of the flight module, applying a yawing moment tending to turn the flight module to the right. The additional control authority provided by the differential morphing duct configuration provides the control system with options that it otherwise would not have.

The leading edge portions of the ducts may move between the low- and high-speed positions asymmetrically, meaning that the leading edge portion of each duct may be divided into a plurality of segments and one segment of the leading edge portion may be in the low-speed position while another segment is in the high-speed position. The leading edge portion may be divided into quadrants, semicircular segments or any other segment of the leading edge portion, with each segment morphable between the low- and high-speed positions independently of the other segments. When one or more segments of the leading edge portion is in the low-speed position but other segments are in the high speed position, then the segment that is in the low-speed position will generate more aerodynamic lift at low speed due to the inrush air flow over that segment under the Bernoulli relation, but will also experience more drag at high speed due to air moving over duct. The leading edge portions of each segment of the duct may be selected to be in the low-speed position, the high-speed position, or any position between the low- and high-speed positions.

The asymmetric lift and drag experienced by the duct due to the asymmetric morphing of the leading edge portion provides that the asymmetrically morphable ducts are selectable control effectors providing redundant control authority to the control system. As a first example, if a ducted fan flight module is hovering in the side-by-side configuration and the segment of the leading edge portions of the ducts toward the rear of the flight module are in the low-speed position while the segment of the leading edge portions toward the front of the flight module are in the high-speed position, then the additional lift generated from the rear portion of the ducts will tend to pitch the flight module forward. As a second example, if the ducted fan flight module is hovering in the tandem configuration, placing the segment of the morphable duct leading edge portions on the starboard side of the flight module into the low-speed position and the duct leading edge portions on the port side of the flight module into the high-speed position will result in greater lift on the starboard side of the flight module, applying a rolling moment toward the left.

As an example of additional control authority due to drag, if the flight module is flying at high speed in the tilted-rotor configuration with the leading edge portions in the high-speed position, then moving the leading edge portions symmetrically to the low-speed position will create additional drag on the flight module, acting as an air brake and slowing the flight module. As a second example, if the flight module is flying at high speed in the tilted-rotor configuration with the morphable ducts in the high-speed position, moving the upper portion of both ducts to the low-speed position will cause additional drag on that portion of the ducts, applying a pitching moment tending to pitch the flight module up.

Morphing the leading edge portions differentially so that the low-speed or high-speed position of one duct is not identical to the other duct may be used by the control system to impart more than one moment to the flight module. For example, when the flight module is hovering in the side-by-side configuration, moving a forward section of the port duct from the low-speed position to the high-speed position will decrease the lift from that location, applying a moment tending to cause the flight module to pitch forward and to roll to the left.

B. Air Dams

The ducted fans may be equipped with other aerodynamic features to provide redundant control authority. For example, the leading edge portion of each duct may be equipped with selectably deployable air dams, which are low barriers that may extend generally normal to the surface of the leading edge portion of the duct. When an air dam is in the deployed position, the air dam extends from the surface of the duct leading edge portion. When the air dam is in the stowed position, the air dam is withdrawn into the surface of the leading edge portion. The air dam in the deployed position interrupts the flow of inrush air over the surface of the inlet portion of the duct, causing the flow to become turbulent and reducing the lift generated by the inrush air flowing over the leading edge portion of the duct. The air dam in the stowed position does not interfere with the flow of air over the leading edge portion.

The air dams may be differentially deployed, with the air dam deployment for one ducted fan not matching the air dam deployment for another other ducted fan. By differentially deploying the air dam for one ducted fan but not another, the thrust of one ducted fan may be adjusted with respect to another. As discussed above for morphing ducts, differential deployment can provide rolling, yawing or pitching moments to the flight module, depending on flight module configuration. Differentially deployable air dams provide the control system with additional control authority and options that it otherwise would not have.

C. Trailing Edge Control Surfaces and Vanes

The air dam may be asymmetrically deployed. The air dam may be divided into segments radially disposed about the circumference of the leading edge portion and each segment may be separately and selectably deployable. All, none or any combination of the sections of the leading edge portions may be in the deployed position. For example, an air dam disposed in a segment along a quarter, a half, or any other part of the circumference of the leading edge portion of the duct may be deployed while the remainder of the air dam for that duct is not deployed. By deploying the air dam around a portion of a duct but not around another portion of the duct, the lift generated by the leading edge portion of the ducted fan may be made asymmetric and thus control moments to the flight module in a manner similar to that of the morphable duct. The control system thus may asymmetrically deploy the air dam to provide redundant control authority and additional control options to the control system.

Any other selectably deployable mechanism may provide redundant control authority from the ducted fans. For example, vanes may direct the flow of air into or out of the ducted fans. As another example, the trailing edges of the duct may be equipped with one or more movable control surfaces. Those mechanisms may be under the control of the control system and may provide redundant control authority to the control system.

IV. BRIEF DESCRIPTION OF THE DRAWINGS

FIG. 4 is a front view of the duct with the leading edge portion in the low-speed position.

FIG. 5 is a side view of the duct with the leading edge portion in the low-speed position.

FIG. 6 is a perspective view of the duct with the leading edge portion in the low-speed position.

V. DESCRIPTION OF AN EMBODIMENT

Figure 1:
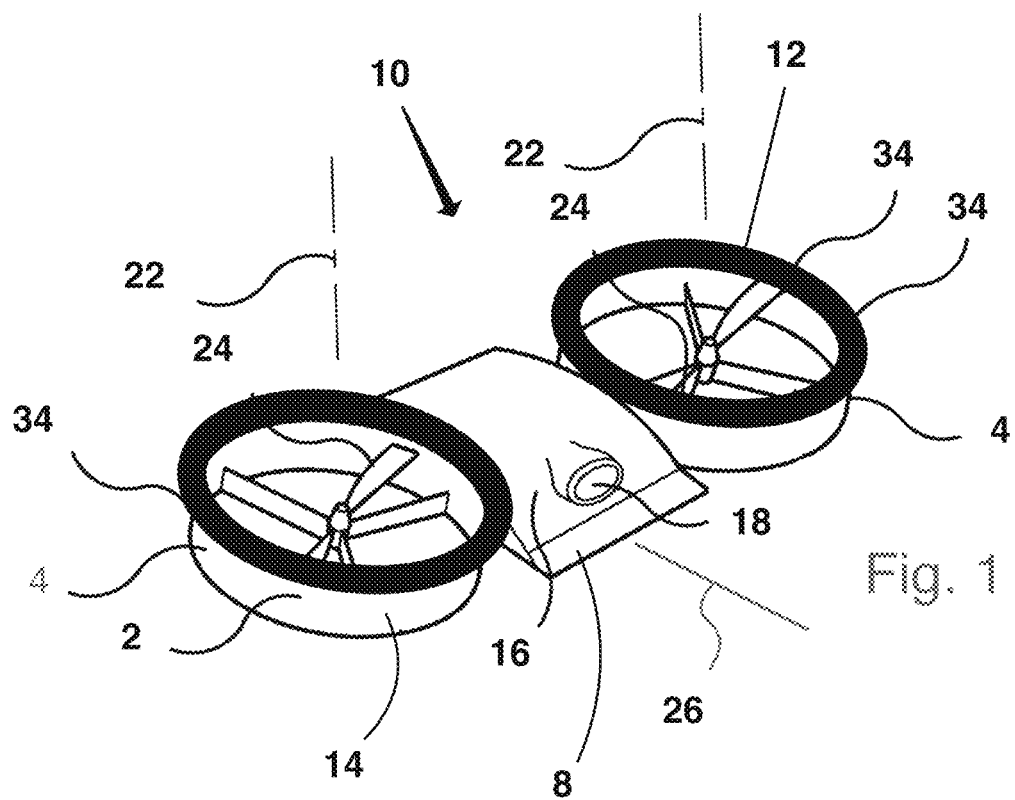
FIG. 1 is a perspective view of the flight module of the modular and morphable air vehicle in the side-by-side configuration with the morphable leading edge portions in the low-speed position.

The invention is duct 2 of a ducted fan 4 that has aerodynamic features 6 that allow the ducted fan 4 to exert control authority over an aircraft 8. An example application of the duct 2 of the invention is a flight module 10 of a modular and morphable air vehicle, as described in the documents incorporated by reference. The duct 2 of the Invention is not limited to the flight module 10 and may be used with any aircraft 8 or any vehicle that utilizes a ducted fan 4.

Figure 2:
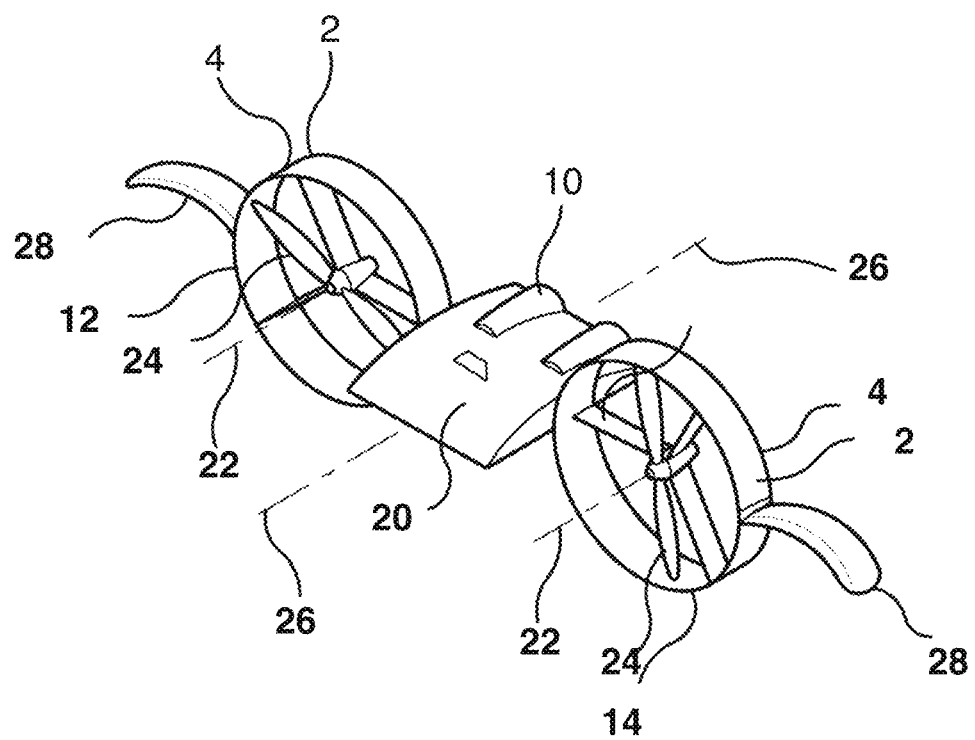
FIG. 2 is a perspective view of the flight module of the modular and morphable air vehicle in the tilt-rotor configuration with the morphable leading edge portions in the high-speed position.
Figure 3:
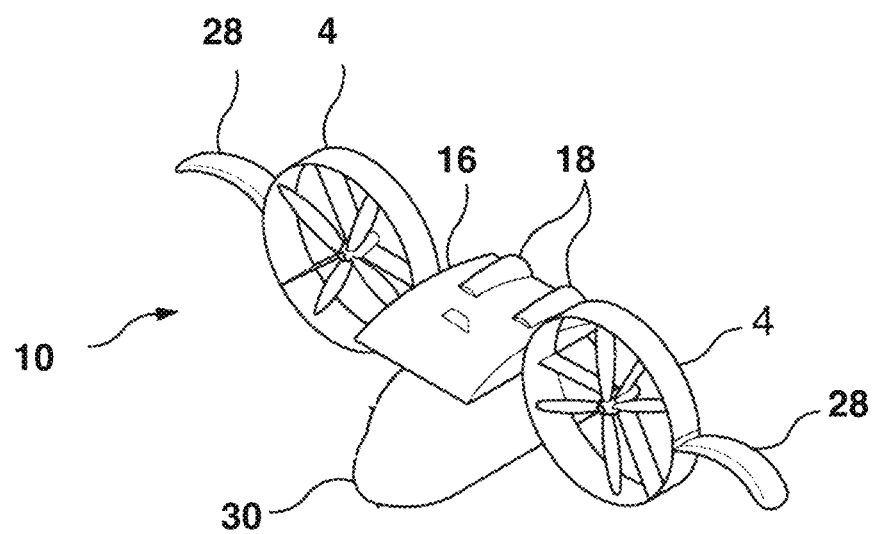
FIG. 3 is a perspective view of the modular and morphable air vehicle including a mission module in the tilt-rotor configuration.
Figure 9:
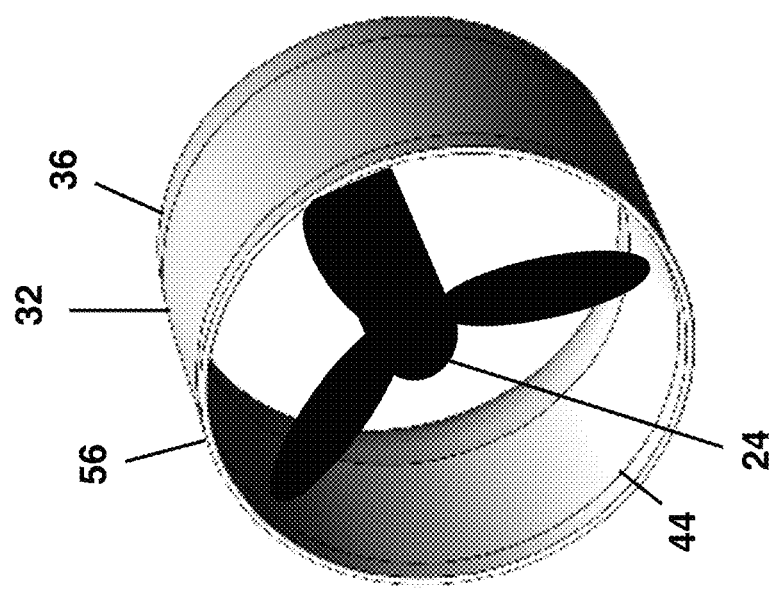
FIG. 9 is a perspective view of the duct in the high-speed position.
Figure 8:
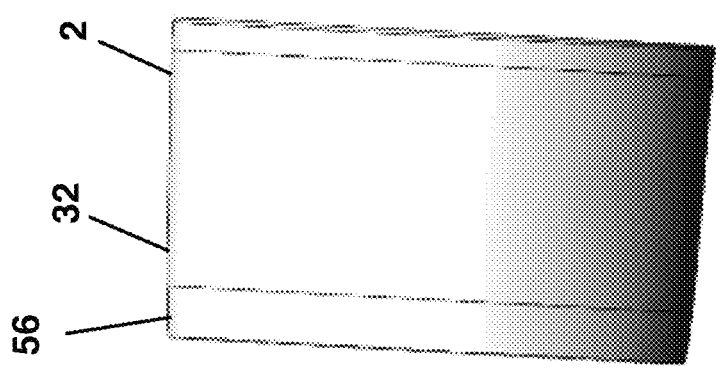
FIG. 8 is a side view of the duct in the high-speed position.
Figure 7:
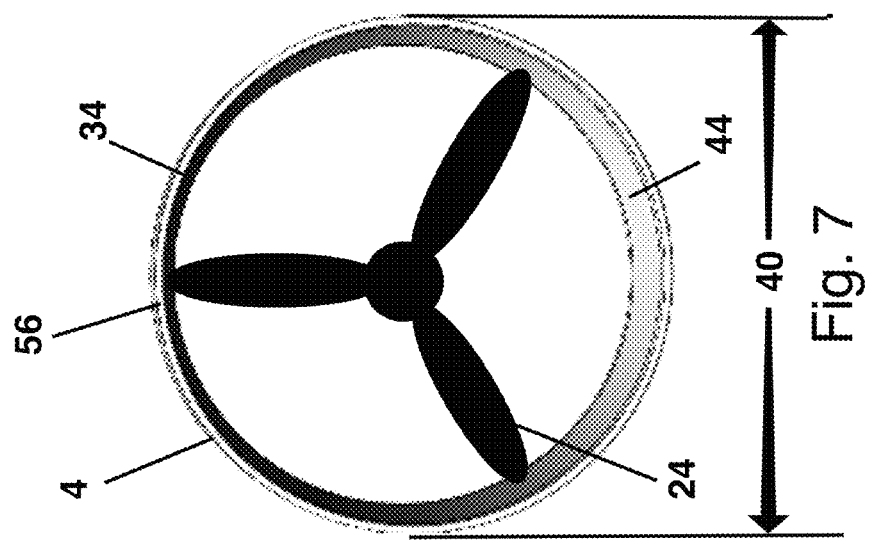
FIG. 7 is a front view of the morphable duct in the high-speed position.

As described in the documents incorporated by reference and as illustrated by FIGS. 1, 2 and 3, a flight module 10 may feature a first ducted fan 12 and a second ducted fan 14. The first and second ducted fans 12, 14 are connected to a central unit 16. The central unit 16 may house the engine(s) 18, drive system for the two ducted fans 12, 14, starter batteries, flight avionics, optional sensors, communications relays and control system 20. The flight module 10 may fly in the side-by-side configuration illustrated by FIG. 1 in low speed and hover in which the axes of rotation 22 of the rotors 24 of the ducted fans 12, 14 are oriented generally normal to the longitudinal axis 26 of the central unit. The flight module 10 may fly in a tilted-rotor configuration as illustrated by FIG. 2 in which the axes of rotation 22 of the rotors 24 are generally parallel to the longitudinal axis 26 of the central unit 12 and the longitudinal axis 26 is generally aligned with the direction of travel. The flight module 10 may fly in any configuration intermediate to the side-by-side configuration and the tilted-rotor configuration. The flight module 10 may have any other configuration taught by the documents incorporated by reference.

Also as taught by the documents incorporated by reference, each of the ducted fans 12, 14 features a circular duct 2 surrounding the rotor 16 and augmenting the thrust generated by the rotor 16. In the tilted-rotor configuration illustrated by FIGS. 2 and 3, the circular ducts 2 also act as circular wings. The circular wings provide lift to the flight module 10 to support the flight module 10 in the air when the flight module 10 is in the tilted-rotor configuration and moving generally in the direction of the longitudinal axis 26. Wing extensions 28 may be attached to the circular ducts and may be deployed to provide additional lift when the flight module 10 is in the tilted-rotor configuration. As illustrated by FIG. 3, the flight module 10 may support a mission module 30 in flight in the side-by-side configuration of FIG. 1 or the tilted-rotor configuration of FIGS. 2 and 3. The mission module 30 may be any of the mission modules 24 included in the documents incorporated by reference.

Each duct 2 has a duct body 32 that defines a duct leading edge portion 34 and a duct trailing edge portion 36. The aerodynamic features 6 of the Invention are disposed at the duct leading edge portions 34 or the duct trailing edge portions 36. The duct leading edge portion 34 has a circumference 38 and a diameter 40 and defines a curved throat 42 that has an inside surface 44. The duct trailing edge portion 36 defines a trailing edge circumference 46.

For an aircraft 8 that has two or more ducted fans 12, the aerodynamic features 6 may be deployed differentially between the ducted fans 20. For any aircraft 8 with a ducted fan 12, the aerodynamic features 6 may be deployed asymmetrically about the ducted fan 12. The aerodynamic features 6 are under the control of the control system 20 and provide additional control authority and additional control authority to the control system 20.

Morphable Duct

For the morphable duct embodiment of the Invention, the leading edge portion 34 may be in a low-speed position 54, illustrated by FIGS. 1, and 4-7, and a high-speed position 56 illustrated by FIGS. 2, 3 and 8-11. Inrush air 48 is pulled into the duct 2 by the turning rotor 16. The leading edge portion 34 defines the inlet for inrush air 30 entering the duct 2. As shown by FIG. 4, when the morphable duct 2 is in the low-speed position 54, the inside surface 44 of the leading edge portion 34 defines a curved throat 42 having a relatively large radius of curvature. The curved throat 42 reduces flow separation of the inrush air 48 from the inside surface 44, reducing turbulence. The inrush air 48 flows across the surface 32 of the curved throat 42, generating lift in the direction indicated by arrow 52 as a result of the Bernoulli relation. The lift generated by the flow of inrush air 48 augments the thrust of the ducted fan 4, 6.

From FIGS. 4 and 5, the diameter 30 of the leading edge portion 34 and hence the frontal area of the ducted fan 4, 6 are relatively large when the leading edge portion 34 is in the low-speed position 54. The large frontal area causes a relatively high drag when the ducted fan 2 is moving through the air in the direction of the rotor axis of rotation 22. The relatively high thrust and relatively high drag of the morphing duct 2 in the low-speed position 54 makes the low-speed position more efficient for hovering and low-speed flight in the side-by-side configuration (FIG. 1) and less efficient for high-speed flight in the tilted-rotor configuration (FIGS. 2 and 3).

Figure 10:
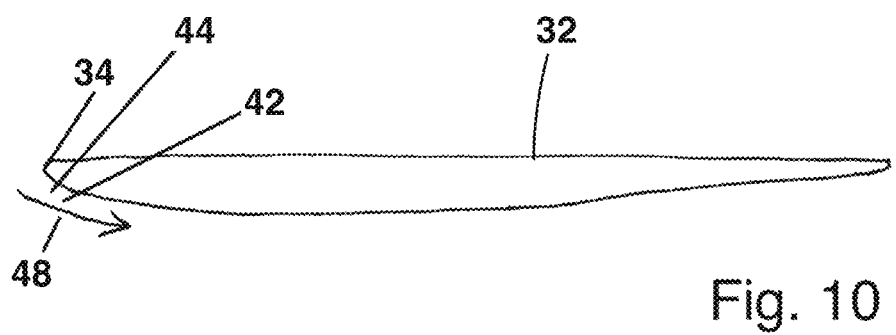
FIG. 10 is a side section view of a wall of the duct in the high-speed position.
Figure 11:
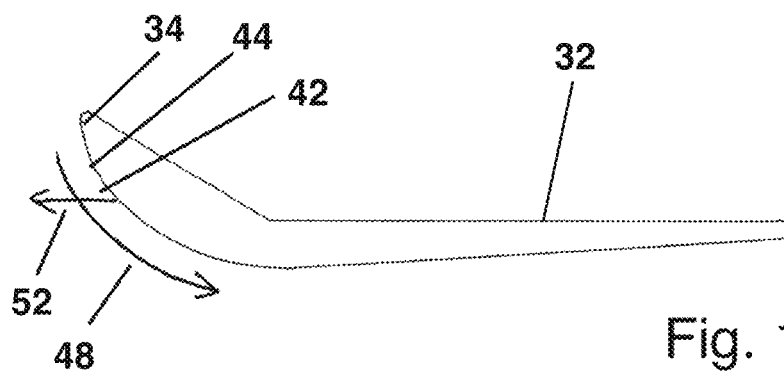
FIG. 11 is a side sectional view of the wall of the duct in the low-speed position.

FIGS. 2, 3 and 8-11 illustrate the morphing ducted fan 4, 6 in the high-speed position 56. As shown by FIGS. 8-11, when the duct 2 is in the high-speed position 56 the leading edge portion 34 of the duct 2 is flattened compared to the leading edge portion 34 in the low-speed position 54. The diameter 30 of the duct 2 at the leading edge portion 34 in the high-speed position 56 is less than the diameter 30 of the leading edge portion 34 in the low-speed position 54. As shown by FIG. 10, the radius of the curve of the curved throat 42 in the high-speed position 56 is not as great as in the low-speed position 54. Because of the relatively small diameter 30 of the leading edge portion 34 and the tight radius of curvature of the curved throat 42, the inrush air 48 moving across the inside surface of the curved throat 42 of the leading edge portion 34 generates a smaller lift in the direction 36 in the high-speed position 56 than when the leading edge 26 is in the low-speed position 54.

Although the ducted fan 2 will not generate as much thrust in the high-speed position 56 compared to the low-speed position 54 for the same input power to the rotor 16, the drag created by the leading edge portion 34 of the duct 2 is reduced compared to the low-speed position 54. In addition, the duct 2 in the high-speed position 56 is better shaped to generating aerodynamic lift due to the movement of air over the surfaces 18 of the duct 2 when the flight module 10 is in the tilted-rotor configuration. The combination of relatively reduced thrust and relatively low drag, combined with improved ability to generate aerodynamic lift, renders the morphing ducted fan 2 in the high-speed position 56 better-suited to high speed flight of the flight module 10 in the tilted-rotor configuration and less-well suited to hover and low-speed operation of the flight module 10 in the side-by-side configuration than is the leading edge portion 34 in the low-speed position 54.

Figure 12:
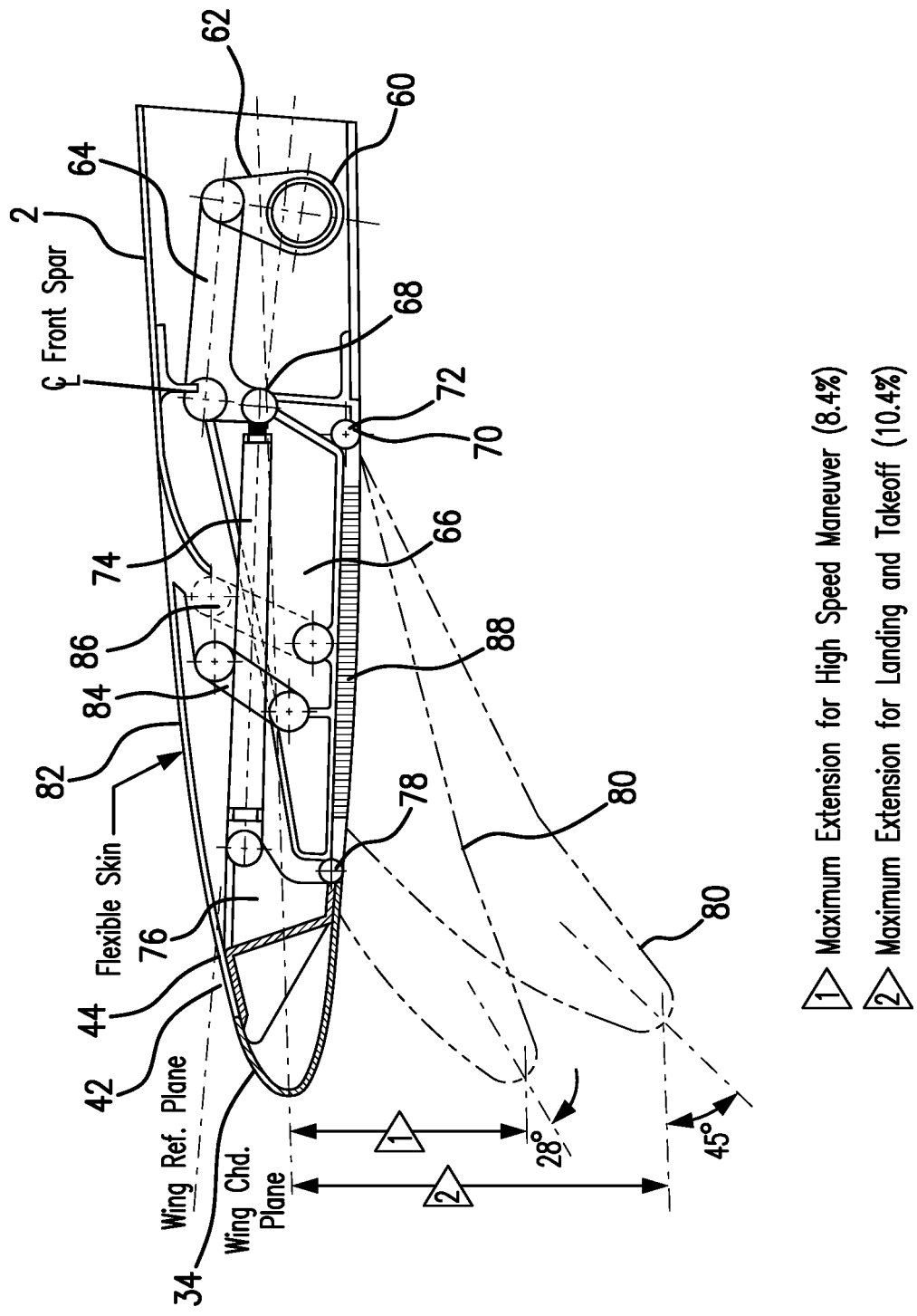
FIG. 12 is side-sectional view of a mechanism to move the leading edge portion between the low- and high-speed positions.

FIG. 12 illustrates a morphing mechanism 58 that will cause the change in shape of the leading edge portion 34 between the low- and high-speed positions 38, 40. FIG. 12 is a cross section through the morphing mechanism 58. Several of the morphing mechanisms 42 are distributed radially about the circumference 38 of the leading edge portion 34. Each morphing mechanism 58 will act locally to change the shape of the leading edge portion 34 between the low- and high-speed positions 38, 40. The morphing mechanisms 42 in combination will cooperate to change the shape of the entire leading edge portion 34. Any suitable number of the morphing mechanisms 42 may be used for the leading edge portion 34 of a duct 2. The inventors anticipate that eight morphing mechanisms 42 may be needed for each duct 2.

For the example morphing mechanism 58 of FIG. 12, a crank actuator 22 is rotatable on its axis and powers the morphing mechanism 58. The crank actuator 60 may be powered by any suitable apparatus that is capable of causing relative motion of one object with respect to the other, including, without limitation, a gear or gear train, a cable, a chain or belt drive, an electro-mechanical actuator such as a solenoid or other magnetic actuator, a stepper motor, a gear motor or a linear motor. The crank actuator 60 may be pneumatically or hydraulically actuated, as by a hydraulic or pneumatic cylinder or other hydraulic or pneumatic actuator.

When the crank actuator 60 turns, crank 62 describes an arc oriented generally toward and away from the leading edge portion 34. The crank 62 is connected by a pin connection to a bell crank 64. The bell crank 64 is attached to a first pivoting member 50 at a bell crank pivot location 68. The first pivot member 66 is hingedly connected to the duct 2 at a first pivot 72 having a first pivot axis of rotation 56. When the crank 62 moves bell crank 64, the bell crank 64 causes the first pivot member 66 to pivot about the first pivot axis of rotation 56, thereby moving the first pivot member 66 with respect to the remainder of the duct 2.

The bell crank 64 is also attached to a first bar 74, which is in turn connected to a second pivot member 76. The second pivoting member 76 is hingedly connected to the first pivot member 66 at a second pivot axis of rotation 78. When the crank 62 moves bell crank 64, the bell crank 64 causes the second pivot member 76 to pivot about the second pivot axis of rotation 78, thereby pivoting the second pivot member 76 with respect to the first pivot member 66.

The first and second pivot members 50,60 move the leading edge portion 34 between the high-speed position, shown by solid lines on FIG. 12, and the low-speed position, shown by the dashed lines 80 on FIG. 12. In moving between the first and high-speed positions, the leading edge portion 34 moves through intermediate configurations shown by dashed lines 80 on FIG. 12.

A flexible skin 82 covers the inside surface of the leading edge portion 34 of the duct 2. The flexible skin 82 is resilient and stretches as the leading edge portion 34 moves to the low-speed position and contracts as the leading edge portion 34 moves to the high-speed position. The flexible skin 82 therefore accommodates the changes in diameter of the leading edge portion 34 and in surface area of the inside surface 14 as the leading edge portion 34 moves between the first and high-speed positions. The flexible skin 82 is sufficiently strong to resist unwanted deformation, as in deformation caused by the difference in air pressure across the flexible skin caused by the Bernoulli relation due to the difference in the speed of air on the inside surface 44 of the duct 2 compared to the speed of air 28 within the structure of the duct 2. The flexible skin 82 must be able to survive exposure to the lubricants, dust and abrasive conditions that will exist within the duct 2.

To avoid unwanted deformation of the flexible skin 82, first and second connecting rods 84, 86 tie the inside surface 44 of the duct 2 to the outer side 72 of the duct 2 at the leading edge portion 34. As an alternative to the flexible skin 82, the leading edge portion 34 may be composed of sliding panels to accommodate the changes in diameter and surface area.

The transition between the low-speed position 54 and the high-speed position 56 of the ducted fan 4 may be linked to the configuration of the flight module 10, so that the leading edge portions 34 move to the low-speed position 54 when the flight module 10 moves to the side-by-side configuration and so that the leading edge portions 34 move to the high-speed position 56 when the flight module 10 moves to the tilted-rotor configuration. The linkage of the positions of the leading edge portion 34 and the configuration of the flight module 10 may be mechanical, as by a mechanical linkage, gear train or cable.

Alternatively, the low- or high-speed positions 54, 56 of the leading edge portion 34 may be determined by the control system 20. The control system 20 may actuate the leading edge portion 34 differentially; for example, so that the leading edge portion 34 of the first ducted fan 12 is in the high-speed position 56 while the leading edge portion 34 of the second ducted fan 14 is in the low-speed position 54. Differential actuation of the leading edge portions 34 provides additional and redundant control authority to the control system 20. For example, when the flight module 10 is in the side-by-side configuration and the control system 20 places the starboard side ducted fan 6 in the high-speed position 4 and the port side ducted fan 4 in the low-speed position 54, the greater lift generated by the port side ducted fan 4 will apply a rolling moment to the flight module 10 tending to roll the flight module 10 to the right. If the flight module 10 is in the tilted rotor configuration and the control system 20 places the starboard side ducted fan 6 in the high-speed position 56 and the port side ducted fan 4 in the low-speed position 54, the additional drag on the port side ducted fan 4 will apply a yawing moment tending to turn the flight module 10 to the left. If the flight module 10 is flying in the tilted rotor configuration and both the port and starboard ducted fans 20 are placed in the low-speed configuration, the additional drag will act as an air brake, slowing the flight module 10. The control system 20 may select any position between the low-speed 38 and high-speed 40 positions for both of the leading edge portions 34.

Figure 13:
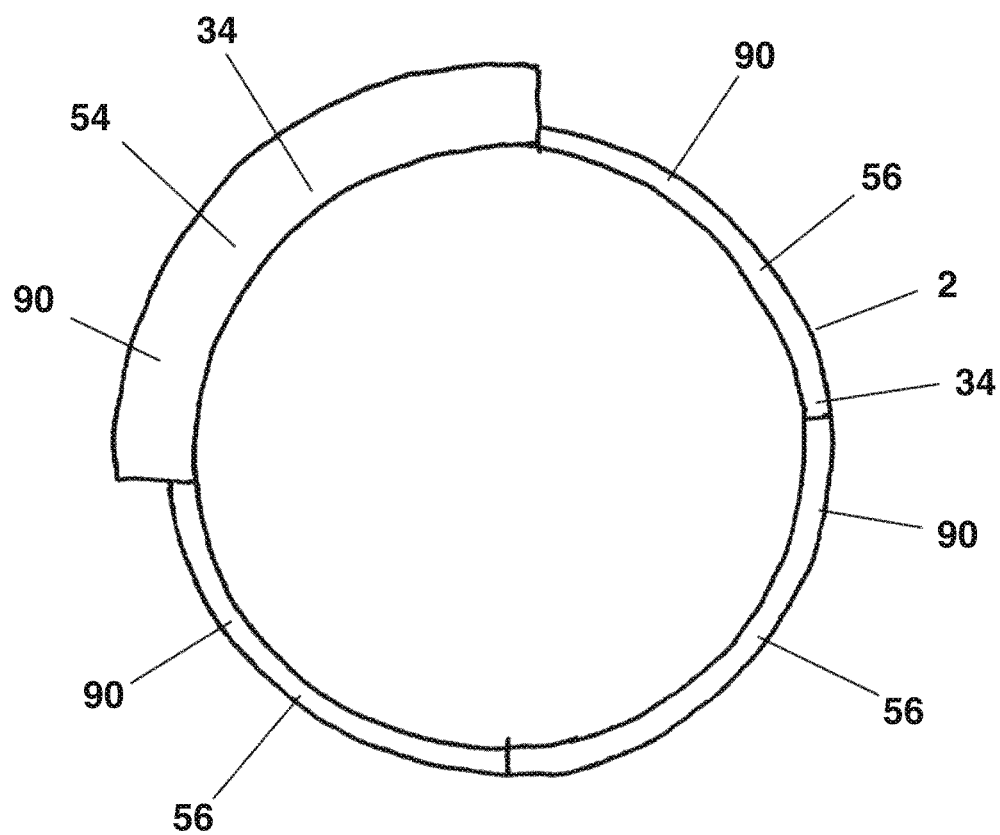
FIG. 13 is a front view of a leading edge portion with one section of the morphable duct in the low-speed position.

The control system 20 also may apply asymmetric control over the leading edge portion 34 of each ducted fan 4. As illustrated by FIG. 13, the leading edge portion 34 of the ducted fans 4 may be divided radially into segments 90, with the position of the leading edge portion 34 for each segment 90 separately controllable by the control system 20. FIG. 13 illustrates the leading edge portion 34 of a duct 2 divided into four segments 90. One of the segments 90 is in the low-speed position 54 and the remaining segments 90 are in the high-speed position 56. The segment 90 in the low-speed position 54 will generate greater lift and greater drag than the other segments 90. The leading edge portion 34 of each duct 2 may be equipped with any desired number of segments 90. All or a portion of each segment 90 may be movable between the low- and high-speed positions 54, 56. The control system 20 is not limited to selecting the low- and high-speed positions 54, 56 and may select any position intermediate to the low- and high-speed positions 54, 56.

Asymmetric adjustment of the leading edge portions 34 between the low- and high-speed positions 54, 56 allows additional and redundant control authority to the control system 20. For example, when the flight module 10 is in the side-by-side configuration and the segments 90 to the rear of the flight module 10 are placed in the low-speed configuration 54 while the segments 90 to the front of the flight module 10 are placed in the high-speed configuration 56, the additional lift generated by the rear-most part of the leading edge portions 34 will apply a pitching moment tending to pitch the front of the flight module 10 down. When the flight module 10 is in the tilted-rotor configuration, placing the segments 90 toward the top if the leading edge portions 34 to the low-speed position 54 while the remainder of the segments 90 are in the high-speed position 56 will increase the drag on the upper portion of the ducts 2. That increased drag will apply a pitching moment tending to pitch the front of the flight module 10 up. The low- and high-speed 54, 56 positions of the segments 90 may be selected both differentially and asymmetrically.

The low and high-speed positions also may be selected symmetrically. For example, when the flight module 10 is in the tilted rotor configuration and flying at high speed, the control system 20 may symmetrically move the leading edge portion 34 to the low-speed position 54, increasing drag on the aircraft 8 and acting as an air brake.

Air Dams

Figure 14:
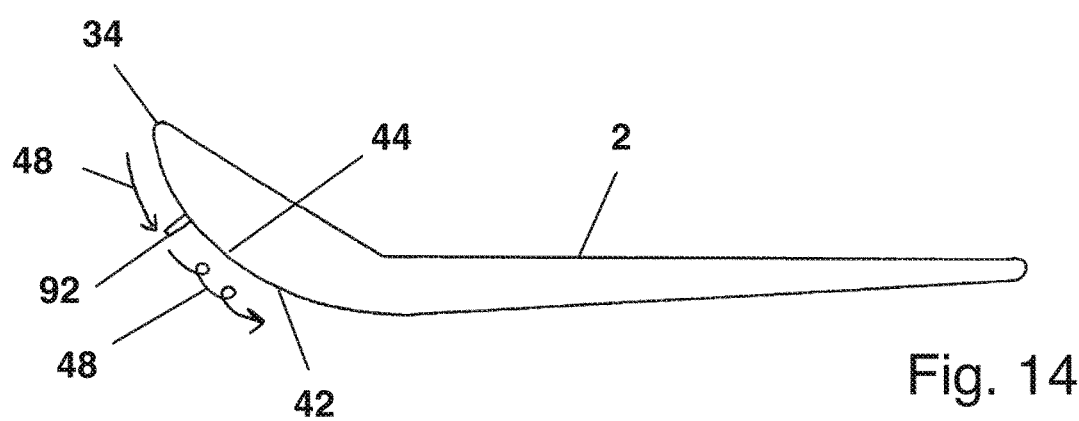
FIG. 14 is a side view of an air dam in the deployed position.
Figure 15:
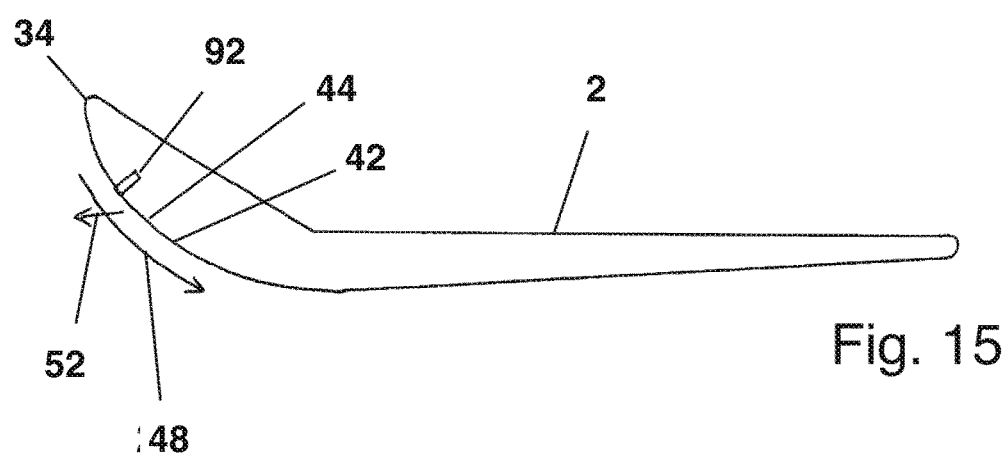
FIG. 15 is a side view of an air dam in the stowed position.

As shown by FIGS. 14, 15, 4 and 6, the leading edge portions 34 may feature air dams 92 to provide additional and redundant control authority to the control system 20. An air dam 92 is a low retractable barrier disposed about the circumference 38 of the leading edge portion 34. FIG. 14 is a cross section of the wall of the duct 2 showing the leading edge portion 34 with an air dam 92 in the deployed position. Inrush air 48 flowing across the inside surface 44 of the curved throat 42 is tripped by the air dam 92. The air becomes turbulent, reducing lift acting on the leading edge portion 34. FIG. 15 shows the air dam 92 in the retracted position. Inrush air 48 is not interrupted by the air dam 92 and the inrush air 48 generates lift in the direction of arrow 52 due to the Bernoulli relation.

The air dam 92 operates under the control of the control system 20, which may deploy the air dams 92 differentially or asymmetrically, as described above for morphable leading edge portions 34. Differential and asymmetric deployment of the air dams 92 provides additional and redundant control authority to the control system 20. To illustrate differential application of the air dams 92, the control system 20 may select a different position for the air dam 92 for the port ducted fan 12 than for the starboard ducted fan 14. If the flight module is flying in the side-by-side configuration and the control system 20 places the air dam 92 for the port ducted fan 12 in the deployed position and the starboard ducted fan 14 in the retracted position, then the reduced lift from the port ducted fan 4 will apply a rolling moment tending to roll the flight module 10 to the left.

The air dams 92 may be deployed asymmetrically, with the leading edge portion 34 divided radially into segments 90 and the air dam 92 in each segment 90 movable between the deployed and retracted position independently from the air dams 92 located in the other segments 90. FIGS. 4 and 6 show the leading edge portion 34 divided into four segments 90, but any number of segments 90 may be used. As an example of asymmetric deployment of the air dams, if the flight module 10 is in the side-by-side configuration and air dams 92 toward the rear of the flight module 10 are in the deployed position while the air dams 92 toward the front of the flight module 10 are in the retracted position, the reduced lift to the rear of the ducted fans 4, 6 will apply a pitching moment tending to pitch the flight module 10 up. The air dams 92 may be deployed both differentially and asymmetrically.

The air dams 92 also may be in a position intermediate to the deployed and retracted positions, all under the control of the aircraft 8 control system 20.

Vanes

Figure 16:
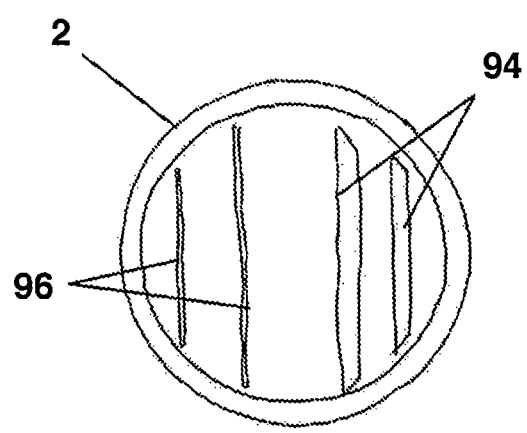
FIG. 16 is a rear view of a duct having exit vanes that are asymmetrically deployed.
Figure 17:
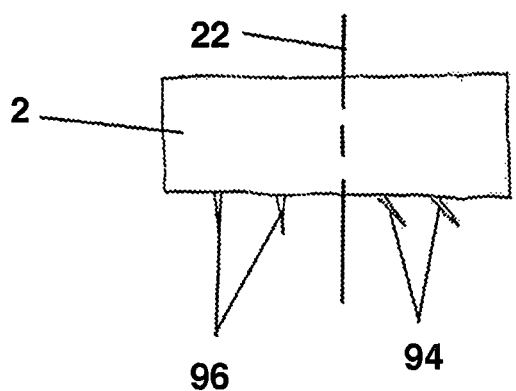
FIG. 17 is a side view of the duct of FIG. 16.

A ducted fan 4 may be equipped with a first vane 94 and a second vane 96 disposed at the trailing edge portion 36 of the duct 2, as illustrated by FIGS. 16 and 17. FIG. 16 is a rear view of a duct 2 having vanes 94, 96. FIG. 17 is a side view of the duct 2. The vanes 94, 96 are located within the flow of air moving from the ducted fan 4. The vanes 94, 96 are located on opposite sides of the rotor axis of rotation 22 and may be actuated differentially and asymmetrically. FIGS. 16 and 17 illustrate vanes 94, 96 actuated asymmetrically. Actuation of all of the vanes 94, 96 in a duct 2 will reduce the thrust from the ducted fan 4 in the direction of the axis of rotation 22 of the rotor 16 and will redirect that thrust laterally. Asymmetric actuation of the vanes 94, 96, as illustrated by FIGS. 16 and 17, will reduce and redirect the thrust in the direction of the axis of rotation 22 in the vicinity of the actuated vanes 80, leaving the thrust from the remainder of the ducted fan 4, 6 undisturbed.

Differential and asymmetric actuation of the vanes 94, 96 provides additional and redundant control authority to the control system 20. As an example, of differential actuation of the vanes 94, 96, when the flight module 10 is flying in the side-by-side configuration and the vanes 94, 96 of the starboard ducted fan 12 are moved to deflect the air from the ducted fan 12 rearward while the vanes 94, 96 of the port ducted fan 14 are not deflected, the thrust in the direction of the axis of rotation 22 of the starboard ducted fan 14 is reduced, applying a rolling moment tending to roll the flight module 10 to the right. The deflection of air from the starboard ducted fan 14 also imparts a yawing moment tending to yaw the flight module 10 to the left. As an example of asymmetric deflection, if the flight module 10 is flying in the side-by-side configuration and the vanes 96 toward the rear of the flight module 10 are deflected rearward while the vanes 94 toward the front of the flight module 10 are not deflected, the thrust from the rear portion of the ducted fans 12, 14 in the direction of the axes of rotation 22 is reduced, applying a pitching moment tending to pitch the front of the flight module 10 up. The deflection of the air also tends to propel the flight module 10 forward.

The differential or asymmetric actuation of the vanes 94, 96 provides additional and redundant control authority that the control system 20 otherwise would not have.

Trailing Edge Control Surfaces

Figure 18:
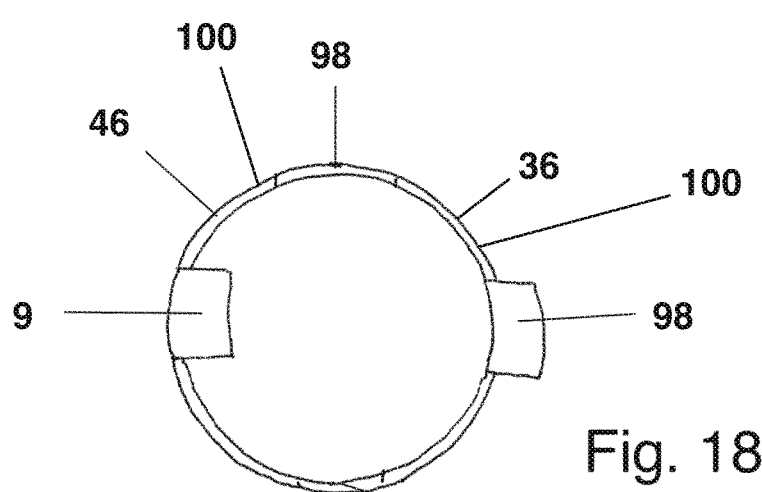
FIG. 18 is a rear view of a duct with trailing edge control surfaces.
Figure 19:
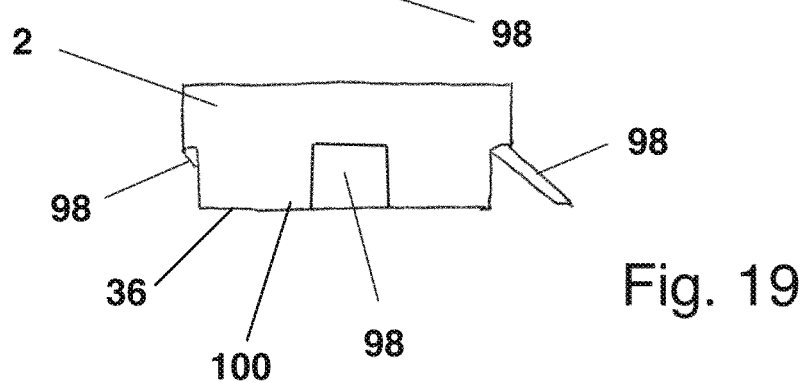
FIG. 19 is a side view of the duct of FIG. 18.

As shown by FIGS. 18 and 19, the trailing edge portion 36 of the duct 2 may define movable trailing edge control surfaces 98 disposed about the trailing edge circumference 46 of the trailing edge portion 36 of the duct 2. The trailing edge circumference 46 may be divided into trailing edge segments 100 in the manner of the segments 90 of the leading edge portion 34. The movable trailing edge control surfaces 98 may be differentially and asymmetrically deployed, as described above for the vanes 94, 96. FIG. 18 is a rear view of a duct 2 with two trailing edge control surfaces 98 deployed and two control surfaces 98 not deployed. FIG. 19 is a side view of the same duct 2 with two trailing edge control surfaces 98 deployed. The control surfaces 98 may be deployed singly or in pairs or in any other configuration that is useful to the control system 20. The differential or asymmetric, or both differential and asymmetric, deploying of the trailing edge control surfaces 98 provides additional and redundant control authority to the control system 20 that the control system 20 otherwise would not have.

Each of the control strategies discussed in this document may be applied differentially among a plurality of ducted fans or asymmetrically about one or more ducted fans, or both differentially and asymmetrically.

The following is a list of numbered elements from the drawings and specification.

Duct 2
Ducted fan 4
Aerodynamic feature 6
Aircraft 8
Flight module 10
First ducted fan 12
Second ducted fan 14
Central unit 16
Engines 18
Control system 20
Axes of rotation 22
Rotors 24
Longitudinal axis 26
48 extensions 28
Mission module 30
Duct body 32
Leading edge portion 34
Trailing edge portion 36
Circumference 38
Diameter of the leading edge portion 40
Curved throat 42
Inside surface 44
Trailing edge circumference 46
Inrush air 48
Direction of lift 52
Low-speed position 54
High-speed position 56
Morphing mechanism 58
Crank actuator 60
Crank 62
Bell crank 64
First pivot member 66
First bell crank pivot location 68
First pivot 70
first pivot axis of rotation 72
first bar 74
second pivot member 76
second pivot axis of rotation 78
dashed lines showing low-speed position 80
flexible skin 82
first connecting rod 84
second connecting rod 86
outer side 88
segments 90
air dam 92
first vane 94
second vane 96
trailing edge control surfaces 98
trailing edge segments 100.

What is claimed is:

1. A duct for a ducted fan of an aircraft, the ducted fan being configured to generate a thrust, the duct comprising:

a. a duct body, said duct body having a leading edge portion, said leading edge portion being configured to generate a lift when said ducted fan is operating;

b. a circumference defined by said leading edge portion, said circumference defining a plurality of segments, said circumference of said leading edge portion defining a curved throat, said curved throat having a surface;

c. an air dam, said air dam being arrayed about at least a one of said plurality of segments in said curved throat, said air dam being selectably movable between a deployed position and a retracted position, said air dam in said deployed position extending above said surface of said curved throat, said air dam in said retracted position being retracted into said surface of said curved throat, said air dam in said retracted position being configured to causes less turbulence at said surface when the ducted fan is operating than in said deployed position, said air dam being asymmetrically deployable about said circumference so that said air dam may be deployed for one of said plurality of segments and not deployed for another of said plurality of segments, whereby said air dam in said deployed position selectably reduces said lift from said segment compared to said air dam in said retracted position.

2. The duct of claim 1 wherein said air dam is selectably deployable for any combination of said plurality of segments.

3. The duct of claim 2 wherein the duct is attached to an aircraft, the duct further comprising: an aircraft control system, said aircraft control system controlling said asymmetrical deployment of said air dam about said circumference of said leading edge portion, whereby said asymmetrically deployable air dam provides redundant and additional control authority to said aircraft control system.

4. The duct of claim 3 wherein said leading edge portion is selectably morphable between a low-speed position and a high-speed position, said morphable leading edge portion having an outside diameter, said outside diameter when said leading edge portion is in said low-speed position being larger than when said leading edge portion is in said high-speed position, whereby when said ducted fan is operating, said low-speed position of said morphable leading edge portion corresponds to greater lift than said high-speed position and said low-speed position of said morphable leading edge corresponds to greater drag than said high-speed position when said ducted fan is moving through an air in a direction of an axis of rotation of a rotor of said ducted fan.

5. The duct of claim 4 wherein said control system is configured to select said low-speed position or to select said high-speed position asymmetrically about said circumference of said leading edge portion.

6. The duct of claim 5 wherein said control system may select said high-speed position or may select said low-speed position or may select from among a plurality of positions intermediate to said low-speed position and said high-speed position for each of said plurality of segments.

7. The duct of claim 4 wherein the ducted fan is one of a plurality of ducted fans, each of said plurality of ducted fans having said air dam that is asymmetrically deployable about said circumference of said leading edge portion, each of said plurality of ducted fans having said leading edge portion that is selectably morphable between a low-speed position and a high-speed position, said plurality of ducted fans each being movable to said low-speed position from said high-speed position, whereby said leading edge portions of said plurality of ducted fans may selectably act as air brakes when said leading edge portions are moved to said low speed position from said high speed position.

8. The duct of claim 5 wherein the ducted fan is one of a plurality of ducted fans, said leading edge portion of each of said plurality of ducted fans having said air dam that is differentially and asymmetrically deployable, each of said plurality of ducted fans having said leading edge portion that is differentially and asymmetrically morphable between a low-speed position and a high-speed position, each of said leading edge portions of each of said plurality of ducted fans is morphable between said low-speed position and said high-speed position independently from each other of said plurality of ducted fans.

9. The duct of claim 8 wherein for each of said plurality of ducted fans said control system may select said high-speed position or may select said low-speed position or may select from among a plurality of positions intermediate to said low-speed position and said high-speed position.

10. The duct of claim 3 wherein said control system may select said deployed position or may select said retracted position or may select from among a plurality of positions intermediate to said deployed position and said retracted position for each of said plurality of segments.

11. The duct of claim 3 wherein the ducted fan is a one of plurality of ducted fans mounted to said aircraft, each of said plurality of ducted fans having said leading edge portion and having said air dam arrayed about at least one segment of said circumference of each said leading edge portion, each of said air dams of each of said plurality of ducted fans being moveable between said deployed position and said retracted position independently from each other of said plurality of ducted fans.

* * * * *